US012759557B2

(12) United States Patent
Arnicar

(10) Patent No.: US 12,759,557 B2
(45) **Date of Patent: *Oct. 13, 2026**

(54) AUTONOMOUS VEHICLE INTERACTION AND PROFILE SHARING

(71) Applicant: Zoox, Inc., Foster City, CA (US)

(72) Inventor: Taylor Andrew Arnicar, Sunnyvale, CA (US)

(73) Assignee: Zoox, Inc., Foster City, CA (US)

(*) Notice: Subject to any disclaimer, the term of this patent is extended or adjusted under 35 U.S.C. 154(b) by 12 days.

This patent is subject to a terminal disclaimer.

(21) Appl. No.: 18/980,365

(22) Filed: Dec. 13, 2024

(65) Prior Publication Data

US 2025/0108811 A1 Apr. 3, 2025

Related U.S. Application Data

(63) Continuation of application No. 17/702,547, filed on Mar. 23, 2022, now Pat. No. 12,187,288.

(51) Int. Cl.
*B60W 40/00* (2006.01)
*B60W 40/04* (2006.01)
(Continued)

(52) U.S. Cl.
CPC ........ *B60W 40/04* (2013.01); *B60W 50/0097* (2013.01); *B60W 60/001* (2020.02);
(Continued)

(58) Field of Classification Search
CPC ............. B60W 40/04; B60W 50/0097; B60W 60/001; B60W 2420/403;
(Continued)

(56) References Cited

U.S. PATENT DOCUMENTS 9,805,601 B1 10/2017 Fields et al.
11,380,108 B1 * 7/2022 Cai ........................ G06V 20/58
(Continued)

FOREIGN PATENT DOCUMENTS

CN 114730521 7/2022
CN 114730521 A * 7/2022 ........ B60W 30/0953
(Continued)

OTHER PUBLICATIONS

Gunda, et al., "Nectar: Automatic Management of Data and Computation in Datacenters", 9th USENIX Symposium on Operating Systems Design and Implementation, 2010, pp. 1-14.
(Continued)

*Primary Examiner* — Peter D Nolan
*Assistant Examiner* — Peter Y Ning
(74) *Attorney, Agent, or Firm* — Lee & Hayes, P.C.

(57) ABSTRACT

Techniques for determining behavior profiles and unique identities for objects observed in an environment surrounding an autonomous vehicle are described. The behavior profiles may be generated and associated with unique identifiers that are stored and used by a fleet of vehicles for planning and navigating in traffic environments. The behavior profiles may be used to control operation of the vehicle and increase safety of the vehicle by identifying potentially risky or erratic objects and navigating through the environment accordingly. The behavior profiles may be stored at a central database and propagated across a fleet to increase observations used to build profiles and thereby increase profile confidence.

20 Claims, 6 Drawing Sheets

(51) Int. Cl.
*B60W 50/00* (2006.01)
*B60W 60/00* (2020.01)
*G08G 1/00* (2006.01)

(52) U.S. Cl.
CPC ......... *G08G 1/20* (2013.01); *B60W 2420/403* (2013.01); *B60W 2420/408* (2024.01); *B60W 2420/54* (2013.01); *B60W 2554/4044* (2020.02); *B60W 2554/4046* (2020.02); *B60W 2554/408* (2020.02)

(58) Field of Classification Search
CPC ....... B60W 2420/408; B60W 2420/54; B60W 2554/4044; B60W 2554/4046; B60W 2554/408; G08G 1/20
See application file for complete search history.

(56) References Cited

U.S. PATENT DOCUMENTS

| | | | | |
|---|---|---|---|---|
| 11,577,722 | B1 * | 2/2023 | Packer | G05D 1/0088 |
| 11,691,634 | B1 * | 7/2023 | Zhou | B60W 50/0097 701/93 |
| 2014/0214533 | A1 * | 7/2014 | Box | G06Q 30/0269 705/14.49 |
| 2014/0236414 | A1 | 8/2014 | Droz et al. | |
| 2015/0178578 | A1 * | 6/2015 | Hampiholi | G08G 1/166 348/149 |
| 2015/0221151 | A1 * | 8/2015 | Bacco | H04L 9/3231 340/5.83 |
| 2017/0316333 | A1 * | 11/2017 | Levinson | B60W 40/04 |
| 2018/0141562 | A1 * | 5/2018 | Singhal | G05D 1/646 |
| 2018/0174457 | A1 | 6/2018 | Taylor | |
| 2018/0233038 | A1 | 8/2018 | Kozloski et al. | |
| 2019/0108753 | A1 | 4/2019 | Kaiser et al. | |
| 2020/0062249 | A1 | 2/2020 | Light et al. | |
| 2020/0242921 | A1 * | 7/2020 | Busch | G08G 1/166 |
| 2021/0008961 | A1 | 1/2021 | Chundrlik, Jr. | |
| 2021/0021423 | A1 * | 1/2021 | Latorre | G06Q 10/10 |
| 2021/0053573 | A1 * | 2/2021 | Raichelgauz | B60W 30/08 |
| 2021/0094558 | A1 * | 4/2021 | Garcia | G08G 1/0129 |
| 2022/0122456 | A1 | 4/2022 | Beaurepaire | |
| 2023/0121749 | A1 * | 4/2023 | Lee | H04L 9/0877 713/171 |
| 2023/0234615 | A1 * | 7/2023 | Wijesekera | G08G 1/0112 701/23 |
| 2023/0286514 | A1 * | 9/2023 | Ucar | B60W 60/0017 |
| 2023/0415753 | A1 * | 12/2023 | Zhou | G05B 17/02 |

FOREIGN PATENT DOCUMENTS

| | | | | |
|---|---|---|---|---|
| EP | 1978523 | | 10/2008 | |
| EP | 1978523 | A2 * | 10/2008 | G11B 27/11 |
| IN | 201741040497 | | 5/2019 | |

OTHER PUBLICATIONS

IBM, "Configuring the hash algorithm for attribute storage", retrieved from <<www.IBM.com/docs/en/sva/10.0.2?topic=attributes-configuring-hash-algorithm-attribute-storage>> on Mar. 1, 2022, 3 pages.

Office Action for U.S. Appl. No. 17/702,534, mailed on Feb. 6, 2024, Taylor Andrew Arnicar, "Autonomous Vehicle Interaction Memory", 21 pages.

Office Action for U.S. Appl. No. 17/702,547, Arnicar, "Autonomous Vehicle Interaction and Profile Sharing", 13 pages.

Office Action for U.S. Appl. No. 17/702,534, Dated Jul. 15, 2024, 21 pages.

* cited by examiner

AUTONOMOUS VEHICLE INTERACTION AND PROFILE SHARING

RELATED APPLICATIONS

This application claims priority to and is a continuation of U.S. patent application Ser. No. 17/702,547, filed on Mar. 23, 2022, the entire contents of which are incorporated herein by reference.

BACKGROUND

An autonomous vehicle can use an autonomous vehicle controller to guide the autonomous vehicle through an environment. For example, the autonomous vehicle controller can use planning methods, apparatuses, and systems to determine a drive path and guide the autonomous vehicle through the environment that contains dynamic objects (e.g., vehicles, pedestrians, animals, and the like) and static objects (e.g., buildings, signage, stalled vehicles, and the like). The autonomous vehicle controller can receive sensor data representative of the environment and can make control decisions based on perceived conditions in the environment. However, merely reactive autonomous vehicle controllers may be slow in predicting erratic or aggressive behaviors of other objects in the environment, which may cause delayed control inputs of the autonomous vehicle, such as to avoid the other objects.

BRIEF DESCRIPTION OF THE DRAWINGS

The detailed description is described with reference to the accompanying figures. The use of the same reference numbers in different figures indicates similar or identical components or features.

DETAILED DESCRIPTION

Figure 1:
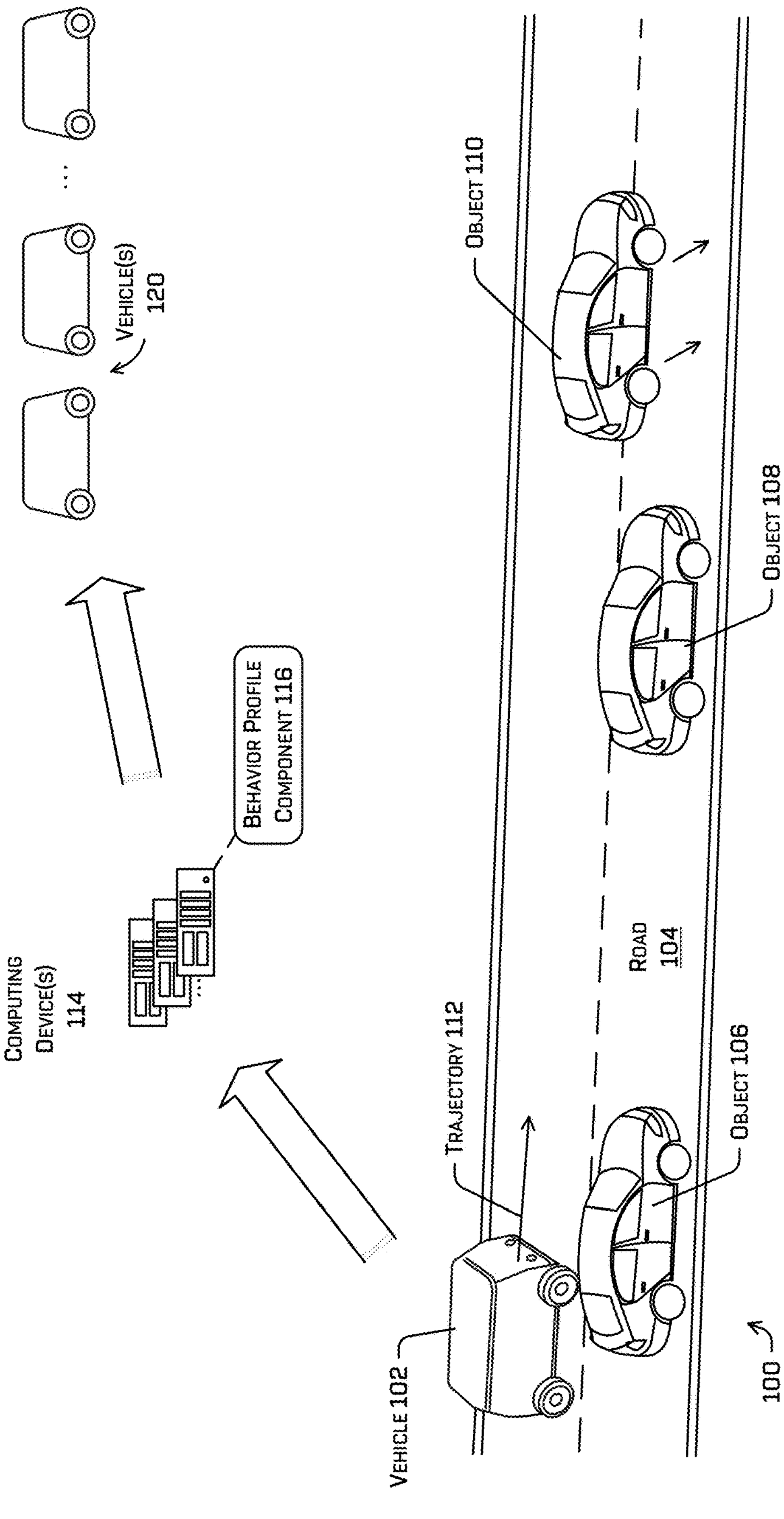
FIG. 1 illustrates an example scenario including a vehicle operating in an environment, the vehicle being configured to generate behavior profiles for objects in the environment.

Techniques described herein relate to determining behavior profiles for objects in an environment around a vehicle (e.g., an autonomous vehicle) that may be used to predict behavior and actions more accurately from the surrounding objects, and thereby navigate the environment with improved efficiency and safety. For example, techniques described herein may take into account a particular behavior profile describing an expected aggressiveness, risk, lawfulness, and other such factors to predict how a neighboring object (e.g., vehicle, bicyclist, pedestrian, etc.) may behave while in proximity to the autonomous vehicle. In a particular example, the behavioral profile may indicate a likelihood to perform aggressive maneuvers in traffic, such as rapidly changing lanes in close proximity to other vehicles, swerving through vehicles in traffic, accelerating through a yellow traffic signal (and thereby increase a likelihood to pass through an intersection on a red light), and/or the like. With the behavioral profiles of the surrounding vehicles, the autonomous vehicle may adjust one or more control parameters in anticipation, for example to be prepared for an action such as running a red light at an intersection that may be unexpected due to typical traffic norms and customs. The behavioral profile may correspond to a particular vehicle, such as based on an identifier associated therewith, and/or a particular person, such as based on individual characteristics that are uniquely determined based on their visible appearances or other indicators of identity.

The behavior profiles may be generated for objects that may be identified from sensor data received by one or more sensors of the autonomous vehicle. In some examples, the sensor data may also include sensors separate from the vehicle but in communication with the vehicle. The vehicle may, for example, receive information from traffic cameras or other sensors mounted in the environment of the vehicle. For example, visible indicators such as license plates, facial recognition, unique bumper stickers, vehicle or object damage, vehicle color, pedestrian gait patterns, vehicle brand, model, and other such indicators. In some examples, the vehicles may be identified by other indicators, such as a communication between the object and the autonomous vehicle over a wireless communication system, for example over a Bluetooth communication channel between a user device or computer system of the object with the autonomous vehicle. By uniquely identifying the objects based on these characteristics, the behavior profiles may be accurately accessed from a stored database when the object is encountered by the autonomous vehicle, or in some examples is encountered by a second autonomous vehicle that is part of a fleet of autonomous vehicles.

The behavior profiles may be stored in the memory cache of the autonomous vehicle for a predetermined period of time after encountering the object, for example for a period of a few minutes or up to several days or weeks or longer. By storing the behavior profile in the memory cache of the autonomous vehicle, the behavior profile may be accessed quickly without requiring communication to a central database. In some examples, the behavior profiles may be stored at a central database for a fleet of autonomous vehicles. The central database may include the behavior profiles, characteristics, unique identifiers, and other such information. In some examples the autonomous vehicles within the fleet may access the central database when a new object is encountered and identified by the autonomous vehicle. In some examples, the behavior profiles for objects may be stored uniquely (e.g., unique behavior profiles are associated with uniquely identified objects) such that a single behavior profile may be applied to a selection of objects, for example as a standard or baseline profile. The behavior profiles may be divided into categories or types such that object identifiers are associated with particular behavior profile types rather than defining unique profiles for every object. In some examples, the behavior profile for the uniquely identified object may be modified based on particular rules or characteristics of the object. For example, identifying acceleration or braking characteristics for an object and modifying a behavior profile based on the acceleration or braking characteristics for the uniquely identified object. For another example, identifying acceleration or braking characteristics for an object and generating a new behavior profile, such as based on a determination that the uniquely identified object does not have an existing profile.

In some examples, the autonomous vehicles may receive a periodic download or push of data including behavior profiles generated across the fleet, including updates to behavior profiles. In some examples, the autonomous vehicles may additionally communicate directly with one another and bypass a central database, for example by conveying behavior profile information in an alert to other autonomous vehicles within a geographic region (e.g., within a predetermined distance of the autonomous vehicle). The alert may be generated in response to the behavior profile including a risk score, aggressiveness score, or other indication that the behavior score differs from a neutral behavior profile by a predetermined threshold. For example, a first autonomous vehicle may encounter a vehicle weaving through traffic and changing lanes dangerously close to other vehicles and in response may generate a behavior profile including a risk score above a predetermined threshold. In response to the risk score being above the predetermined threshold, the first autonomous vehicle may alert a second autonomous vehicle operating within a predetermined distance of the location of the object and notify of the risk score and the behavior profile as well as the location and/or direction of travel of the object. The second autonomous vehicle may thereby adjust one or more control parameters to plan a route or ensure safety protocols are prepared to anticipate a risky or unsafe action by the object if encountered.

Techniques described herein offer various benefits to safety and predictability of navigating autonomous vehicles through an environment by generating behavioral profiles for objects, refining the behavior profiles, and building accurate models of expected behavior by surrounding objects such that the autonomous vehicle may accurately and safely navigate through the objects and environment. Furthermore, techniques described herein are directed to improvements in safety. That is, identifying particularly risky behavior from an object operating in an environment of the autonomous vehicle may enable the autonomous vehicle system to plan a route to avoid and/or prepare to quickly react to anticipated aggressive, risky, or unsafe actions by the object.

FIG. 1 illustrates an example scenario including a vehicle 102 operating in an environment 100 and generating behavior profiles for objects in the environment 100. The example scenario illustrates the interactions and navigation of a vehicle 102 through an environment 100. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like.

The vehicle 102 may be in communication with computing device(s) 114 that may communicate across a fleet of vehicle(s) 120 including the vehicle 102. The computing device(s) 114 may be a central computing device that manages a fleet of autonomous vehicles or may be a plurality of computing devices distributed through the vehicle(s) 120. The computing device(s) 114 may include a behavior profile component 116, discussed in further detail with respect to FIG. 4 below, that may enable generation, management, and access to behavior profiles for a plurality of objects that the vehicle(s) 120 may encounter in the example environment 100.

The vehicle 102 travels through the example environment 100 on a road 104 with objects 106, 108, and 110 (illustrated as vehicles though other objects such as pedestrians, bicycles, and the like may be envisioned and used in place of the vehicles). FIG. 1 depicts an example of a trajectory 112 for vehicle 102, represented as an arrow indicating a heading, velocity, and/or acceleration, although the trajectory itself may comprise instructions for a controller, which may, in turn, actuate a drive system of the vehicle 102. For example, the trajectory 112 may comprise instructions for a controller of the vehicle 102 to actuate one or more drive systems of the vehicle 102 to effectuate a steering angle and/or steering rate, which may result in a vehicle position, vehicle velocity, and/or vehicle acceleration. The trajectory 112 may comprise a target heading, target steering angle, target steering rate, target position, target velocity, and/or target acceleration for the controller to track. Such components may be controlled by the controller of the vehicle 102 configured to establish control parameters, such as to adjust how closely the vehicle 102 navigates in proximity to other objects, a braking distance for the vehicle 102, and other such control and/or navigation parameters.

According to the techniques discussed herein, data gathered by the vehicle 102 may include sensor data from sensor(s) of the vehicle 102. For example, the sensor(s) may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.).

The sensor(s) may generate sensor data, which may be received by a computing device of the vehicle 102 and/or the computing device(s) 114. In some examples, some or all of the sensor(s) may be separate from and/or disposed remotely from the vehicle 102, and data capture, processing, commands, and/or controls may be communicated to/from the vehicle 102 by one or more remote computing devices, such as computing device(s) 114, via wired and/or wireless networks.

In the example scenario 100, an object 110 ahead of the vehicle 102 (traveling along road 104 in the direction of trajectory 112) is changing lanes from a left lane to a right lane and is in close proximity to object 108. The object 110 may be uniquely identified based on characteristics sensed or perceived by the vehicle 102. The object 110 may be uniquely identified based on visible markers such as a license plate, make, model, color, vehicle damage, bumper stickers, gait pattern, clothing, appearance, or other such characteristics, including visible and non-visible characteristics (e.g., a wireless communication between a device associated with the object and the vehicle 102. The distance between object 108 and object 110 may be less than an accepted safe distance and the object 110 may be changing lanes in a rapid manner indicative of an aggressive traffic maneuver that puts both the object 110 and the object 108 in danger. The computing device of the vehicle 102 may observe the actions and behavior of the object 110 and may build a behavior profile, or adjust an existing behavior profile to reflect the observed behavior (e.g., accounting for the aggressive lane-change tactics, proximity to adjacent vehicles, etc.). The behavior profile may indicate a risk score for the object 110 that reflects the risk associated with the object based on such irregular, unlawful, aggressive, or other behavior while navigating in the environment 100. The generated behavior profile may be associated with the unique identity for the object 110 such that the behavior profile may be accessed or interacted with as needed when the object 110 is viewed at a later time.

After observing the behavior of the object 110 and building or adjusting the behavior profile of the object 110, the computing device of the vehicle 102 may navigate within the example environment 100 based on the additional knowledge from the behavior profile. For instance, after identifying the object 110 and developing or adjusting the behavior profile to reflect the observed behavior, the computing system of the vehicle 102 may navigate or plan a route through the example environment 100 based on the additional knowledge. As a non-limiting example, after developing a behavior profile for the object 110, and identifying a high likelihood to change lanes in close proximity to other vehicles, the computing system of the vehicle 102 may adjust a control parameter to maintain a larger distance from the object 110, such as to account for potential aggressive behaviors. In some examples, particular behavior may be reflected in the behavior profile (e.g., likelihood to run a red light, likelihood to pass within a threshold distance of an adjacent object, etc.). In some examples, the behavior profile may reflect a general risk score, aggressiveness score, or other score that may be reflective of observed patterns of behavior within the example environment 100. In some examples, a machine learned model may identify one or more behavior profile factors and/or parameters associated with the object 110 and may generate a risk score or multiple scores indicative of a likelihood to act or behave in the example environment 100.

In some examples, the actions of the object 110 may be compared against a predicted or expected action or behavior by the object to determine a deviation or divergence from expected behavior. The deviation from expected behavior may represent a likelihood that the object 110 will deviate from an expected behavior. The expected behavior may be based on expert-defined rules, machine learning models trained using simulated or real-world traffic data, or other such data. The deviation from expected behavior may be used to identify outliers or potentially risky objects 110, as deviation from an expected behavior may pose a greater risk or threat to the vehicle 102 based on the unpredictable behavior. In some examples, a machine learning model may be trained using labeled data identifying aggressive, overly cautious, unpredictable, erratic, or other behaviors. The machine learning model may then be used to determine a deviation score from expected behavior. In some examples, actions may be scored based on deviation from rules of the road (e.g., coming to a complete stop at a stop sign versus an incomplete stop, using a turn signal indicator before changing lanes or turning versus without using an indicator at all, etc.).

In some examples, the behavior profile information may be determined partially or in whole by a teleoperator viewing or controlling one or more operations of the vehicle 102. The teleoperator may, for example, determine a bucket or type of behavior profile to assign to a particular object visible to the perception system of the vehicle 102. In some examples, the behavior profile may be altered or adjusted by the teleoperator based on observed behavior.

The behavior profile information may be stored in a memory on-board the vehicle 102 and/or in the computing device(s) 114. The memory on-board the vehicle 102 may be configured for rapid access of behavior profiles such that recently encountered objects and their associated behavior profiles may be re-accessed directly by the computing device of the vehicle 102 without communication across a network with the computing device(s) 114, and may thereby decrease time to access the behavior profiles. In some examples, the behavior profiles may be stored in a transitory manner, such that the behavior profiles persist while an object (e.g., object 110) is within range of the vehicle 102 as well as a predetermined period of time after the object is no longer in observable range of the vehicle 102. For example, the behavior profile and identifiable characteristics of the object may be maintained for a period of several minutes to several weeks or more after observation of the object.

The behavior profile information may be stored using a hashing algorithm or other algorithm usable to anonymize data usable to store object features anonymously. The object features may then be used to lookup behavior profile information for an object encountered in the environment. The hashing or other algorithm may be configured to receive different object features (visible or invisible markers and indicators) and output a uniquely identifiable code representative of those object features. In this manner, the object features may be used as identifiers for the objects, thereby preserving object anonymity and privacy. In some examples, the unique identity of the object may also be determined using third-party data (e.g., identifying a vehicle owner based on publicly available records).

In some examples, the behavior profiles and associated data may be stored indefinitely either on-board the vehicle 102 and/or at the computing device(s) 114, for example in association with the behavior profile component 116. The behavior profiles may be stored with respect to the vehicle(s) 120 and may reflect observations from the vehicle(s) 120 within the fleet. The behavior profiles may be updated as vehicle 102 and other vehicle(s) 120 observe the object. As further observations are made and additional details are gathered with respect to the behavior profiles, a confidence score associated with the behavior profile may increase, indicative of a greater confidence in the behavior profile as the additional observations are incorporated into the behavior profile.

In some examples, the vehicle 102 may communicate directly with the vehicle(s) 120 after generating and/or updating the behavior profile of object 110. For example, after generating or updating the behavior profile for object 110 to reflect the increased risk associated with the observed lane-change behavior, the vehicle 102 may communicate to other vehicle(s) 120 within proximity (e.g., within a threshold distance or geofenced area) of the vehicle 102 data associated with the object 110 and the associated behavior profile. The communication to the vehicle(s) 120 may include one or more characteristics by which the object 110 may be identified, such as visible markers including license plates, make, model, type, color, brand, and other such information for the object 110. In some examples, the characteristics may include facial features of an operator associated with the object 110, a gait or cycling pattern for a pedestrian or cyclist, a light scheme associated with a bicycle, and/or other characteristics by which the object 110 may be uniquely identified. Because the identification of the object is based on visible markers and not on matching such markers against outside databases, the identities of the individuals can be anonymous, thereby ensuring privacy protection while also enabling unique identification of the object 110, for ease of association with the behavior profile.

Figure 2:
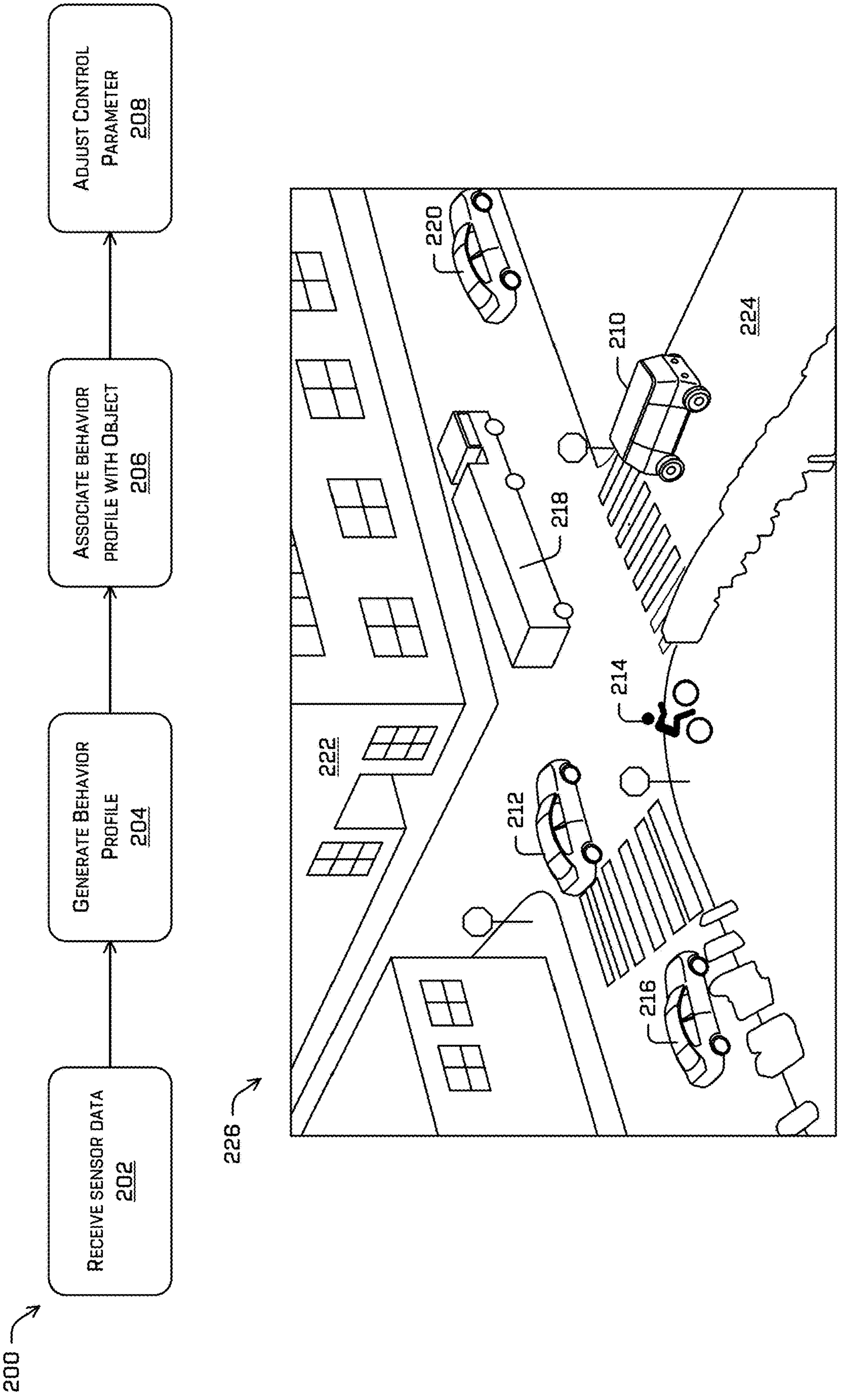
FIG. 2 illustrates a flow diagram of an example process for generating a behavior profile for an object alongside a view of an environment in which a vehicle is operating.

FIG. 2 illustrates a flow diagram of an example process 200 for generating a behavior profile for an object within proximity of a vehicle 210 alongside a view of an environment 226 in which the vehicle 210 is operating. The vehicle 210 may be an example of the vehicle 102 described above with respect to FIG. 1. The example process 200 may be used to generate and/or update a behavior profile for one or more objects in the environment 226 for use by the vehicle 210 in navigating the environment 226.

At operation 202, the example process 200 may include receiving sensor data from a sensor array of the vehicle 210. The sensor data may include any sensor data gathered by the sensors of the vehicle 210 including the types of data described above. The sensor data may include information reflecting the presence of the objects within the environment 226. The objects may include a vehicle 212, a bicyclist 214, a vehicle 216, a truck 218, and a vehicle 220 operating on a roadway 224 in and around buildings 222. The sensor data may indicate the presence, location, and characteristics of each of the objects, such that each object may be uniquely identified by the vehicle 210.

At operation 204, the example process 200 may include generating a behavior profile for one or more of the objects in the environment 226. The behavior profiles may be generated based on observed behavior of the objects, for example, how the bicyclist 214 crosses the road 224, whether vehicle 212 yielded at a stop sign or not, whether vehicle 216 comes to a complete stop at a stop sign, the speed of vehicles traveling on the roadway 224, and other such information. The behavior profiles may reflect the risks associated with navigating the roadway 224 in proximity to the objects present. In some examples, the behavior profiles for each object may initially include a neutral behavior profile that reflects overall anticipated behavior from the objects and may be adjusted or changed as observations of behavior are recorded by the vehicle 210.

At operation 206, the behavior profiles may be associated with the objects in the environment 226. The association may be based on a unique identifier associated with each object. For instance, determining one or more identifying characteristics by which the object may be identified and associating the behavior profile with the identifying characteristics. In some examples, a unique identifier may be generated to further anonymize the data for the objects. The unique identifier may be associated with identifying features of the objects as well as the behavior profile. The unique identifier and/or identifying features may be searchable within a database stored on-board the vehicle 210 and/or at a remote computing device in communication with the vehicle 210, such as computing device(s) 114. In this manner, as the vehicle 210 or other vehicles come into contact with the objects, the behavior profiles associated with objects may be identified by first identifying the objects using features or characteristics. After associating with the objects, the identifiers, characteristics, and behavior profiles, collected data may be communicated to a remote computing device to update a database of behavior profiles used by a fleet of vehicles and/or to alert vehicles of particular objects having behavior profiles indicating a particular risk when in proximity.

At operation 208, the example process 200 includes adjusting a control parameter for the vehicle 210. An adjustment to the control parameter may include adjusting an operating envelope of the vehicle 210, thereby increasing a distance between the vehicle 210 and one or more objects in the environment 226. In some examples, the operating envelope may be adjusted with respect to an identified aggressive or risky object, such as an object identified as being associated with a behavior profile indicating an increased risk to the vehicle 210. That is, the operating envelope may be adjusted with respect to the identified object, while a second or standard envelope may be used for other objects within the environment. The control parameter may also include a braking distance, navigation parameters, perception component, or component of a trip and/or route planner, or other such parameters used to control the vehicle 210 within the environment 226.

In some examples, at operation 208, the example process 200 may include using the behavior profile information in one or more additional systems. For instance, the behavior profile information may be used to train a prediction model for an autonomous vehicle to predict behaviors of external objects. The information may also be used to train control systems of autonomous vehicles to account for deviations from expected behaviors. The information may also be used to develop risk profiles that may be used by one or more vehicle systems or external systems for various risk, modeling, and planning operations.

Figure 3:
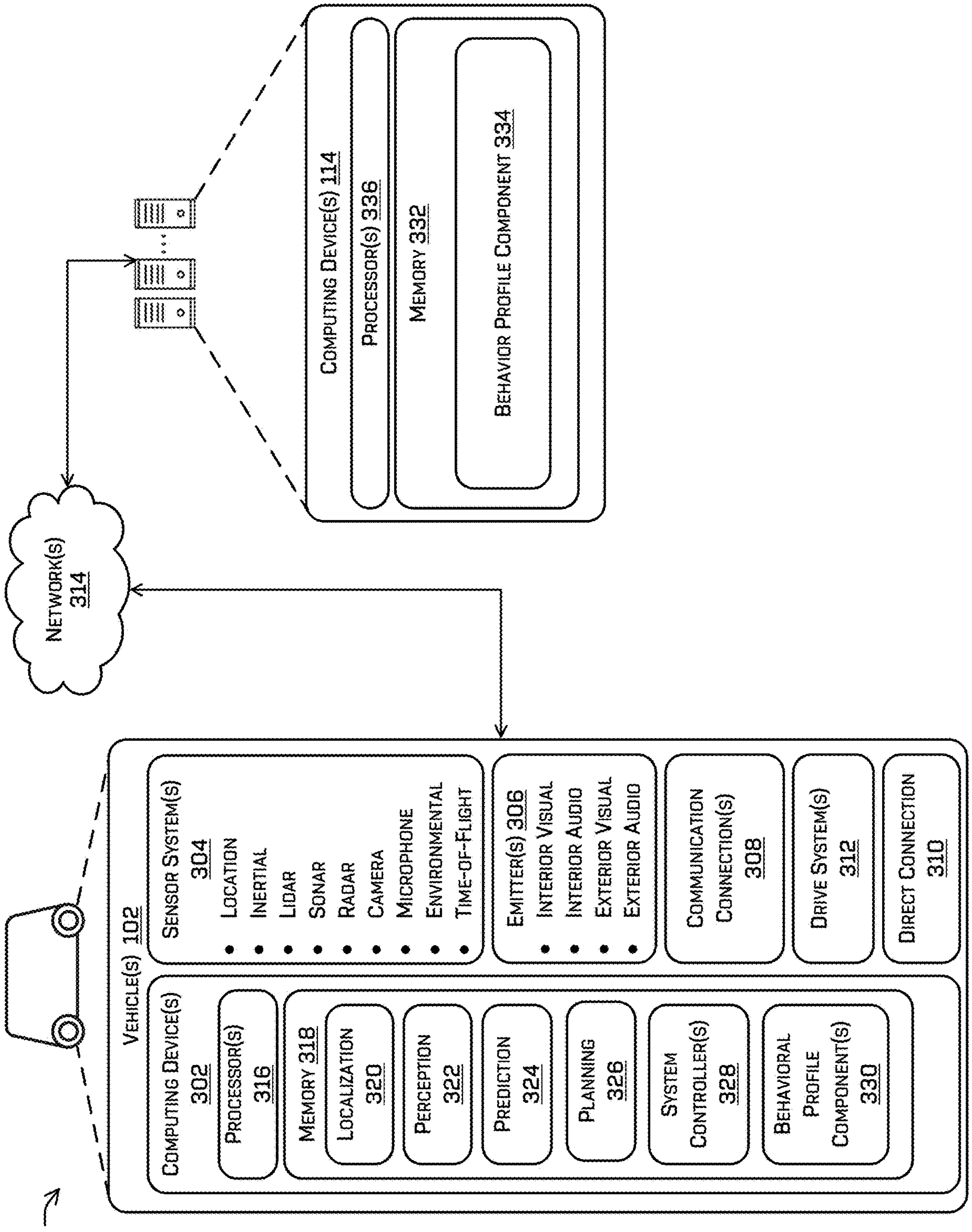
FIG. 3 illustrates an example block diagram of a vehicle illustrating elements of the vehicle system that may enable behavioral profile generation and use.

FIG. 3 depicts a block diagram of an example system 300 for implementing the techniques discussed herein. In at least one example, the example system 300 can include a vehicle(s) 102. In the example system 300, the vehicle(s) 102 is an autonomous vehicle; however, the vehicle(s) 102 can be any other type of vehicle (e.g., a driver-controlled vehicle that may provide an indication of whether it is safe to perform various maneuvers).

The vehicle(s) 102 can include a computing device(s) 302, one or more sensor system(s) 304, one or more emitter(s) 306, one or more communication connection(s) 308 (also referred to as communication devices and/or modems), at least one direct connection 310 (e.g., for physically coupling with the vehicle(s) 102 to exchange data and/or to provide power), and one or more drive system(s) 312. The one or more sensor system(s) 304 can be configured to capture sensor data associated with an environment.

The sensor system(s) 304 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 304 can include multiple instances of each of these or other types of sensors. For instance, the time-of-flight sensors can include individual time-of-flight sensors located at the corners, front, back, sides, and/or top of the vehicle(s) 102. As another example, the camera sensors can include multiple cameras disposed at various locations about the exterior and/or interior of the vehicle(s) 102. The sensor system(s) 304 can provide input to the computing device(s) 302.

The vehicle(s) 102 can also include one or more emitter(s) 306 for emitting light and/or sound. The one or more emitter(s) 306 in this example include interior audio and visual emitters to communicate with passengers of the vehicle(s) 102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 306 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle(s) 102 can also include one or more communication connection(s) 308 that enable communication between the vehicle(s) 102 and one or more other local or remote computing device(s) (e.g., a remote teleoperations computing device) or remote services. For instance, the communication connection(s) 308 can facilitate communication with other local computing device(s) on the vehicle(s) 102 and/or the drive system(s) 312. Also, the communication connection(s) 308 can allow the vehicle(s) 102 to communicate with other nearby computing device(s) (e.g., other nearby vehicles, traffic signals, etc.).

The communications connection(s) 308 can include physical and/or logical interfaces for connecting the computing device(s) 302 to another computing device or one or more network(s) 314 (e.g., the Internet). For example, the communications connection(s) 308 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 308 may comprise the one or more modems as described in detail above.

In at least one example, the vehicle(s) 102 can include one or more drive system(s) 312. In some examples, the vehicle(s) 102 can have a single drive system. In at least one example, if the vehicle(s) 102 includes more than one drive system(s) 312, a single one of the drive system(s) 312 can be positioned on opposite ends of the vehicle(s) 102 (e.g., the front and the rear, etc.). In at least one example, the drive system(s) 312 can include one or more sensor system(s) 304 to detect conditions of the drive system(s) 312 and/or the surroundings of the vehicle(s) 102. By way of example and not limitation, the sensor system(s) 304 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 312. In some cases, the sensor system(s) 304 on the drive system(s) 312 can overlap or supplement corresponding systems of the vehicle(s) 102 (e.g., sensor system(s) 304).

The drive system(s) 312 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 312 can include a drive system controller which can receive and preprocess data from the sensor system(s) 304 and to control operation of the various vehicle systems. In some examples, the drive system controller can include one or more processor(s) and memory communicatively coupled with the one or more processor(s). The memory can store one or more components to perform various functionalities of the drive system(s) 312. Furthermore, the drive system(s) 312 also include one or more communication connection(s) that enable communication by the respective drive system with one or more other local or remote computing device(s).

The computing device(s) 302 can include one or more processor(s) 330 and memory 332 communicatively coupled with the one or more processor(s) 316. In the illustrated example, the memory 318 of the computing device(s) 302 stores a localization component 320, a perception component 322, a prediction component 324, a planning component 326, one or more system controller(s) 328, and one or more behavioral profile component(s) 330. Though depicted as residing in the memory 318 for illustrative purposes, it is contemplated that the localization component 320, the perception component 322, the prediction component 324, the planning component 326, the one or more system controller(s) 328, and the one or more behavioral profile component(s) 330 can additionally, or alternatively, be accessible to the computing device(s) 302 (e.g., stored in a different component of vehicle(s) 102 and/or be accessible to the vehicle(s) 102 (e.g., stored remotely).

In memory 318 of the computing device(s) 302, the localization component 320 can include functionality to receive data from the sensor system(s) 304 to determine a position of the vehicle(s) 102. For example, the localization component 320 can include and/or request/receive a three-dimensional map of an environment and can continuously determine a location of the autonomous vehicle within the map. In some instances, the localization component 320 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 320 can provide data to various components of the vehicle(s) 102 to determine an initial position of an autonomous vehicle for generating a trajectory, as discussed herein.

The perception component 322 can include functionality to perform object detection, segmentation, and/or classification. In some examples, the perception component 322 can provide processed sensor data that indicates a presence of an entity that is proximate to the vehicle(s) 102 and/or a classification of the entity as an entity type (e.g., car, pedestrian, cyclist, building, tree, road surface, curb, sidewalk, unknown, etc.). In additional and/or alternative examples, the perception component 322 can provide processed sensor data that indicates one or more characteristics (also referred to as parameters) associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, a geographic position, an indication of darkness/light, etc.

The perception component 322 can include functionality to store perception data generated by the perception component 322. In some instances, the perception component 322 can determine a track corresponding to an object that has been classified as an object type. For purposes of illustration only, the perception component 322, using sensor system(s) 304 can capture one or more images of an environment. The sensor system(s) 304 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 304, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (collections of historical positions, orientations, sensor features, etc. associated with the object over time) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 324 can generate one or more probability maps representing prediction probabilities of possible locations of one or more objects in an environment. For example, the prediction component 324 can generate one or more probability maps for vehicles, pedestrians, animals, and the like within a threshold distance from the vehicle(s) 102. In some instances, the prediction component 324 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 326 can determine a path for the vehicle(s) 102 to follow to traverse through an environment. For example, the planning component 326 can determine various routes and paths and various levels of detail. In some instances, the planning component 326 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 326 can generate an instruction for guiding the autonomous vehicle along at least a portion of the route from the first location to the second location. In at least one example, the planning component 326 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 326 can alternatively, or additionally, use data from the perception component 322 to determine a path for the vehicle(s) 102 to follow to traverse through an environment. For example, the planning component 326 can receive data from the perception component 322 regarding objects associated with an environment. Using this data, the planning component 326 can determine a route to travel from a first location (e.g., a current location) to a second location (e.g., a target location) to avoid objects in an environment. In at least some examples, such a planning component 326 may determine there is no such collision free path and, in turn, provide a path which brings vehicle(s) 102 to a safe stop avoiding all collisions and/or otherwise mitigating damage. The planning component 326 may additionally navigate based on behavioral profiles of one or more objects in proximity to the path of the vehicle(s) 102, for example to avoid or give a wide berth to an object with a risk profile exceeding a predetermined threshold.

In at least one example, the computing device(s) 302 can include one or more system controller(s) 328, which can be configured to control steering, propulsion, braking, safety, emitters, communication, and other systems of the vehicle(s) 102. These system controller(s) 328 can communicate with and/or control corresponding systems of the drive system(s) 312 and/or other components of the vehicle(s) 102, which may be configured to operate in accordance with a path provided from the planning component 326.

The vehicle(s) 102 can connect to computing device(s) 114 via network(s) 314 and can include one or more processor(s) 330 and memory 332 communicatively coupled with the one or more processor(s) 330. In at least one instance, the one or more processor(s) 330 can be similar to the processor(s) 316 and the memory 332 can be similar to the memory 318. In the illustrated example, the memory 332 of the computing device(s) 114 stores a behavior profile component 334 that may perform one or more tasks of the behavior profile component 402 and/or other techniques described herein. Though depicted as residing in the memory 332 for illustrative purposes, it is contemplated that the components can additionally, or alternatively, be accessible to the computing device(s) 114 (e.g., stored in a different component of computing device(s) 114 and/or be accessible to the computing device(s) 114 (e.g., stored remotely).

The processor(s) 316 of the computing device(s) 302 and the processor(s) 336 of the computing device(s) 114 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 318 computing device(s) 302 and the memory 332 of the computing device(s) 114 are examples of non-transitory computer-readable media. The memory 318 and 332 can store an operating system and one or more software applications, instructions, programs, and/or data to implement the methods described herein and the functions attributed to the various systems. In various implementations, the memory 318 and 332 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 318 and 332 can be implemented as a neural network.

Figure 4:
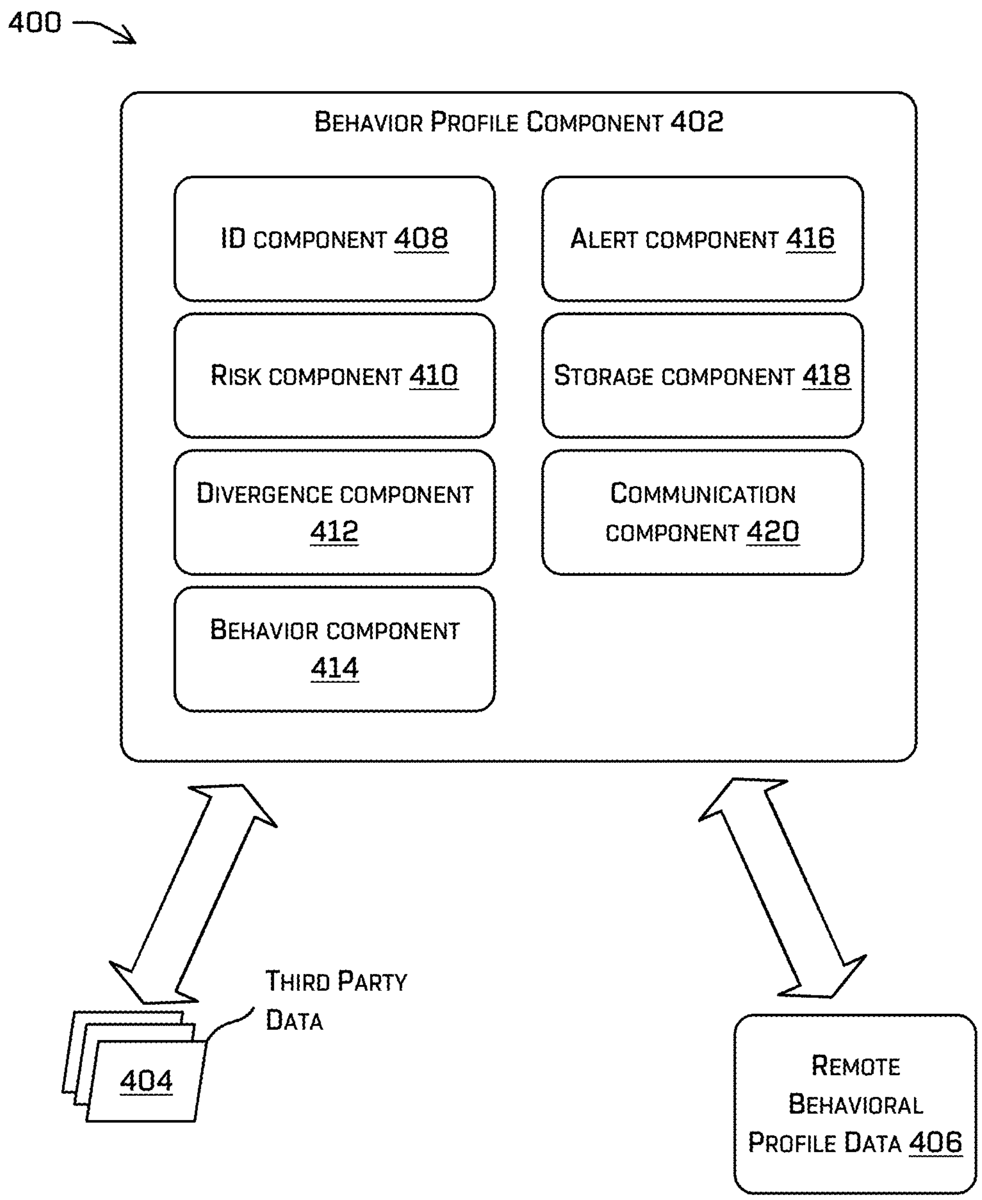
FIG. 4 illustrates an example block diagram showing elements of a behavior profile component of a vehicle system.

FIG. 4 illustrates an example block diagram 400 showing elements of a behavior profile component 402 of a vehicle system. The behavior profile component 402 may be an example of the behavior profile component 116 and/or the behavior profile component 330 of FIGS. 1 and 3 described above. The behavior profile component 402 may be embodied within an on-board computing system of a vehicle 102 and/or a computing system associated with a fleet of vehicle(s) 120. The behavior profile component 402 is shown as including several discrete components and/or components. The behavior profile component 402 may be structured and divided in other ways to suit particular implementations of the techniques described herein.

The behavior profile component 402 may be configured to communicate with a remote behavioral profile database 406 and/or a third-party database 404. The remote behavioral profile database 406 may include behavior profiles and identifying information associated with objects identified and profiled by one or more vehicles within a fleet. The database may be stored at a remote computing device and communicated to or accessed by each of the vehicles within the fleet as required. In some examples, the behavior profile component 402 may access data and/or receive updates from the remote behavioral profile data 406 at a periodic or regular interval. The third-party data 404 may include information from one or more additional sources and may include information such as vehicle models, vehicle types, object identifier types, and other data that may be used to identify and/or generate a behavior profile for the objects in the environment around the vehicle. In some examples, the third-party data may include sensor data from external sensors such as traffic cameras or other vehicle fleets that may be in communication or capable of communicating with the behavior profile component 402.

The behavior profile component 402 includes an identification component 408, a risk component 410, an aggressiveness component 412, a behavior component 414, an alert component 416, a storage component 418, and a communication component 420. The behavior profile component 402 may include additional or fewer components and may be located in a single location (e.g., a single computing device) or may be distributed across multiple computing devices.

The identification component 408 may receive sensor data from a sensor array of the vehicle and may identify objects within the environment. Identifying the objects may include determining a unique identifier for each object and/or determining an identity for an object based on one or more characteristics of the object as described herein. The identification component may generate the identifiers such that each object is anonymously identified within a storage associated with the behavior profile component 402 such that individual privacy may be maintained for external objects while also enabling unique identification of each object. In this manner, the data for each object may be associated with visible characteristics but may not include personal identification information or personal information associated with operators of the objects.

The risk component 410 may include a machine learning model or other system for generating a risk score associated with an object observed by the vehicle. The risk component 410 may generate a risk profile and/or a risk score for the object. The risk score may be indicative of a likelihood that the object will undertake an action that may be in violation of traffic laws and/or unexpected or outside of traffic customs or norms. The risk score may be reflective of a likelihood that the object will perform in a risky manner, including actions such as failing to yield, following too closely behind another vehicle, and other such behavior. The divergence component 412 may determine a divergence score for the object. The divergence score may be a component of the risk score, and may reflect a likelihood that the object will deviate from an expected behavior such as changing lanes rapidly, cutting off a vehicle without sufficient clearance, exceeding posted speed limits by more than a threshold amount, turning or changing lanes without signaling, crossing an intersection before signaled to cross, and other such identifiable deviations from expected traffic behavior. The divergence score and/or the risk score may be used to identify objects that may pose a threat to safety and/or navigation of the vehicle 102. In some examples, the actions of the object may be compared against a predicted or expected action or behavior by the object to determine the divergence score. The expected behavior may be based on expert-defined rules, machine learning models trained using simulated or real-world traffic data, or other such data. The deviation score may be used to identify outliers or potentially risky objects, as divergence from an expected behavior may pose a greater risk or threat to the vehicle 102 based on the unpredictable behavior. In some examples, a machine learning model may be trained using labeled data identifying aggressive, overly cautious, unpredictable, erratic, or other divergent behaviors. The machine learning model may then be used to determine the divergence score from expected behavior. In some examples, actions may be scored based on divergence from rules of the road (e.g., coming to a complete stop at a stop sign versus an incomplete stop, using a turn signal indicator before changing lanes or turning versus without using an indicator at all, etc.).

The behavior component 414 may be used to generate behavioral profiles for objects that may reflect and/or describe behaviors that the object has undertaken in particular situations and may be expected to undertake in future scenarios. The behavior component 414 may include multiple factors and/or may include descriptive models for each object, the descriptive models used to identify behaviors and/or actions that may deviate from a neutral or expected behavior from such objects. The expected or neutral behavior may be based on neutral profiles that may be expert-defined and represent typical behavior from an average object of the type identified by the behavior profile component 402. In some examples, the expected or neutral behavior may be determined based on observed characteristics of objects in an environment, such as behaviors observed by one or more vehicles over a period of time in the environment.

In some examples, the behavior component 414 may be configured to identify neutral behaviors for a particular environment or region in which the vehicle is operating. In such examples, the neutral behavior may be associated with the particular environment or region and observed behaviors in that environment or region can be appropriately assessed relative to the neutral behaviors. For example, a first set of neutral behaviors can be associated with a first urban area (e.g., first city) and a second set of neutral behaviors can be associated with a second urban area (e.g., second city). The behavior component 414 may thus identify the particular environment or region in which the vehicle is operating and apply the appropriate neutral behaviors for the particular environment or region.

The alert component 416 may be configured to alert one or more additional computing devices, such as additional vehicle systems and/or a remote computing device in the event of a risk score, aggressiveness score, or behavioral model exceeding a predetermined threshold or deviating from a neutral or average profile (e.g., neutral behavior profile, average behavior profile, etc.). The alert may be generated in response to a score exceeding a threshold and may be communicated across a fleet of vehicles and/or to vehicles within a predetermined distance of the object and/or a vehicle associated with the vehicle system.

The storage component 418 may store one or more risk scores, aggressiveness scores, and/or behavior profiles at a memory of the vehicle and/or at a remote database. In at least one example, the risk scores, aggressiveness scores, and/or the behavior profiles are stored based on associated identifiers (e.g., identifying information of an object or operator thereof). In some examples, the storage component 418 may include a memory cache stored on-board the vehicle where behavior profiles, risk scores, aggressiveness scores, and the like may be stored. The memory cache may include data that is readily accessible to a planning component or control system of the vehicle. The memory cache may be configured to retain behavior profile data and the like for a limited period of time, for example while the object is within detection of the sensors of the vehicle in addition to a predetermined period of time after the object is out of range of the sensors. In this manner the most recent objects interacted with by the vehicle are readily profiled and the profile data accessible to the vehicle control system. Additionally, the profile data may be searched rapidly and efficiently due to the limited amount of object data that may be maintained.

In some examples, the storage component 418 may be configured to store and/or access behavior and other profile data associated with objects at a local and/or remote memory device. The storage component 418 may periodically provide updates of scores and profiles to a central database for a fleet and may likewise provide access to the central database or receive updates from the central database.

The communication component 420 may include one or more components for communication between the behavior profile component 402 and other components of the vehicle system and/or remote systems such as network-connected devices. The communication component may configure transfer of behavior data, risk data, aggressiveness data, and other such data as well as enabling communication to control systems for use of such data in controlling operation of the vehicle.

Figure 5:
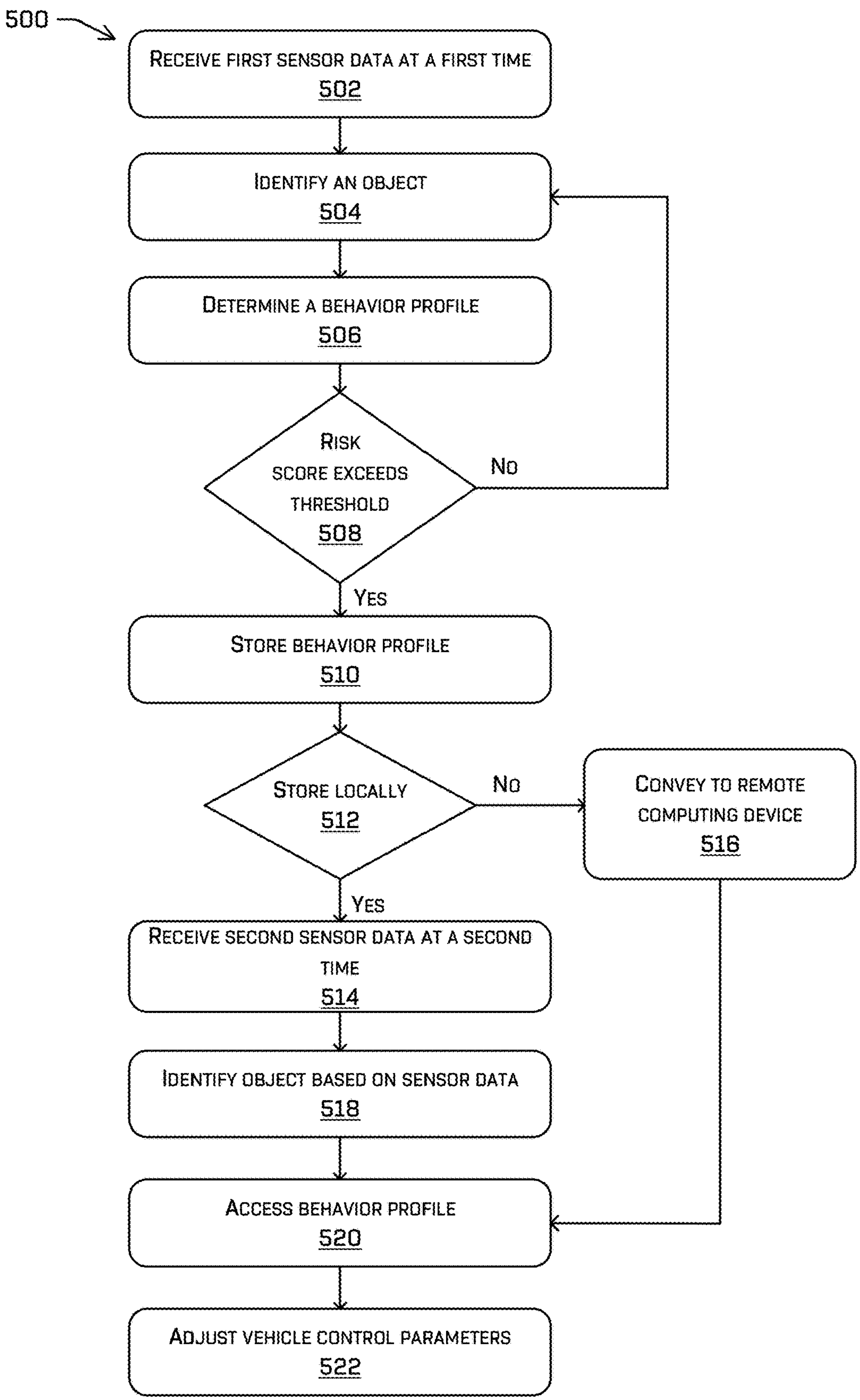
FIG. 5 illustrates an example flow diagram for a vehicle system to generate and use stored behavior profiles to navigate an environment.
Figure 6:
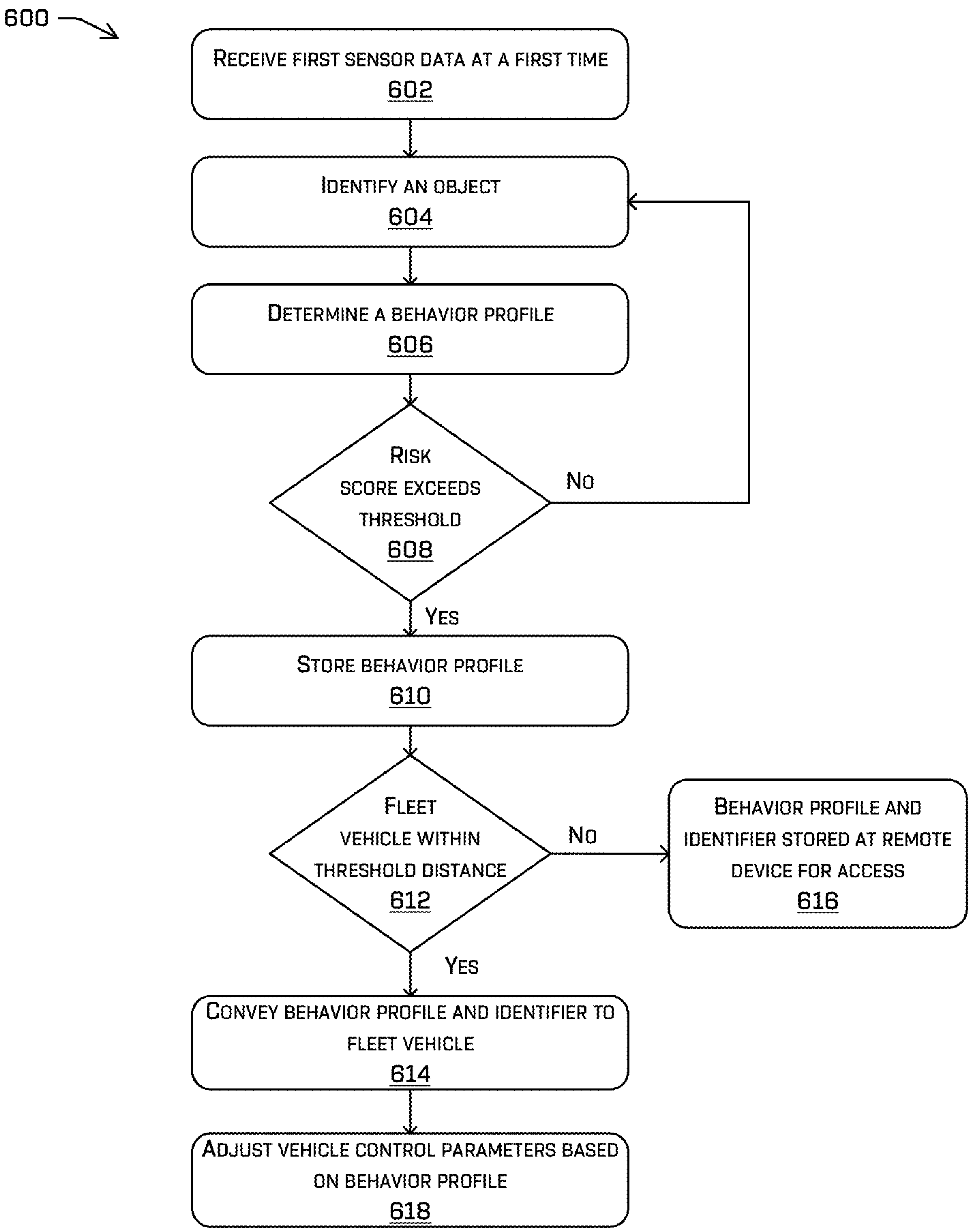
FIG. 6 illustrates an example flow diagram for a vehicle system to generate and distribute behavior profiles amongst a fleet of vehicles.

FIGS. 5 and 6 illustrate example processes in accordance with examples of the disclosure. These processes are illustrated as logical flow graphs, each operation of which representing a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted and/or combined in any order and/or in parallel to implement the processes.

FIG. 5 illustrates an example flow diagram for a process 500 that may be performed by a vehicle system to generate and use stored behavior profiles to navigate an environment. The process 500 may be performed by one more processors of one or more computing devices, such as computing device(s) 114, vehicle computing device(s) 304, or other computing devices described herein. The process 500 may be embodied in computer-readable instructions stored on a non-transitory computer readable medium that are executable by one or more processors to perform the process 500.

At operation 502, the process 500 includes receiving first sensor data at a first time. The first sensor data is received from the sensors of the vehicle system as the sensors gather data regarding the surrounding environment. As described above, the first sensor data may include image data, location data, orientation data, speed, velocity, and other such data related to operating a vehicle, such as an autonomous vehicle, within an environment.

At operation 504, the process 500 includes identifying an object based at least in part on the first sensor data. The object may be identified by one or more characteristics. The characteristics may include visible characteristics such as license plates, vehicle color, vehicle model, gait pattern, clothing worn, facial features and/or facial recognition techniques, and other such image-based techniques. In some examples, the characteristics may include non-visible characteristics such as distinct sounds, such as engine sound profiles, wireless communications and/or pings from remote computing devices, and other such recognizable features of objects. In some examples, the identification may be sufficient to uniquely identify the object but may not include personal identifying information that would enable identification of identifying information for an owner, operator, or pedestrian associated with the object. In this manner, the object may be uniquely identified while maintaining personal and individual privacy.

At operation 506, the process 500 includes determining a behavior profile for the object. The behavior profile may be determined based on the sensor data and may include actions performed by the object in the environment. The actions may be compared against expected behavior and/or a neutral behavioral profile to identify behavior patterns of the objects. The behavior profile may include expected actions based on previously observed behavior, risk scores, aggressiveness scores, and other such information.

At operation 508, the process 500 includes determining whether a risk score exceeds a threshold. The risk score exceeding a threshold may include identifying a particularly high-risk or at-risk object within the environment. In some examples the threshold may be for a behavior profile, aggressiveness score, or other metric based on object behavior and performance. The determination may be performed to identify objects that vary more than a threshold amount from an expected behavior or profile. In response to determining that a score does not exceed a threshold, the profile may not be stored for the particular object. In some examples a neutral profile may be used for the object and a next object may be identified at 504 to continue generating behavior profiles. In response to the score exceeding the threshold, the behavior profile may be stored either locally or at a remote computing device.

Based on a determination that the risk score does not meet or exceed the threshold ("No" at operation 508), the process 500 includes identifying another object operating in the environment. In some examples, the system can be configured to continually identify different objects in the environment to determine whether an object operating proximate the object may constitute a risk to the safe operation thereof (e.g., aggressive behavior profile, etc.).

Based on a determination that the risk score exceeds the threshold ("Yes" at operation 508), the process 500, at operation 510, includes storing the behavior profile. Storing the profile may include storing at a local device, such as in a memory cache with a memory that may only persist a predetermined length of time after the object has left the detectable range of the sensor array of the vehicle. In some examples after the period of time the behavior profile may be removed and/or erased from the memory cache. In some examples, storing the profile may include storing at a remote device.

At operation 512, the process 500 includes determining whether to store the behavior profile locally on-board the vehicle. Determining whether to store the profile locally may be based on whether the object is still within detectable range and/or expected to intersect the path of the vehicle in the near future. For example, if an object is encountered traveling in an opposite direction to the vehicle then the object may have a lower likelihood to interact with the vehicle in the near future and therefore the profile may be stored locally for a shorter period of time and/or may not be stored locally but may only be stored at a remote computing device. Based on a determination that the behavior profile will not be stored locally ("No" at operation 512), the process 500, at operation 516, includes conveying the behavior profile to a remote computing device in response to determining not to save the profile at the local device.

Based on a determination to store the behavior profile locally ("Yes" at operation 512), the process 500, at operation 514, includes receiving second sensor data at a second time. The sensor data may include sensor data from a sensor array of the vehicle and may include a similar type of data to the first sensor data. The second sensor data may be received at a second time later in time than the first time, after the behavior profile is generated and stored.

At operation 518, the process 500 includes identifying an object based on an identifier determined from the second sensor data. The behavior profile may be identified by searching a database of behavior profiles associated with characteristics of objects. The behavior profiles may be filtered based on the characteristics to identify the object uniquely and its unique profile. In some examples, identifying the object may include uniquely identifying the object using techniques such as described above with respect to block 504. Identifying the object may also include identifying an object type of the object.

At operation 520, the process 500 includes accessing a behavior profile for the object. The behavior profile may be accessed from a remote computing device and/or a local storage using the unique identifier determined based on the characteristics of the object. In some examples an object may not have a behavior profile and therefore accessing a behavior profile may include generating a neutral behavior profile indicative of expected average behavior from the type of object as determined at 518. In some examples, the behavior profile may be generated based on an aggregate of similar object types. For example, a pedestrian who does not have a behavior profile may have a neutral profile assigned and/or may receive an average or aggregate of existing behavior profiles for pedestrians or other similar objects.

At operation 522, the process 500 includes adjusting a vehicle control parameter based on the behavior profile. Adjusting the vehicle control parameter may include changing operation, planning, or control of a vehicle system in response to the information included within the behavior profile. For example, a high-risk score may be used to control the vehicle system to introduce additional safety factors to account for the increased risk while in proximity to the object. In some examples the changes may be based on proximity to the object, such that such changes may only be applied when the vehicle is within a threshold distance of the object.

FIG. 6 illustrates an example flow diagram for a process 600 that may be performed by a vehicle system to generate and distribute behavior profiles amongst a fleet of vehicles. The process 600 may be performed by one more processors of one or more computing devices, such as computing device(s) 114, vehicle computing device(s) 304, or other computing devices described herein. The process 600 may be embodied in computer-readable instructions stored on a non-transitory computer readable medium that are executable by one or more processors to perform the process 600.

At operation 602, the process 600 includes receiving first sensor data at a first time. The first sensor data is received from the sensors of the vehicle system as the sensors gather data regarding the surrounding environment. As described above, the first sensor data may include image data, location data, orientation data, speed, velocity, and other such data related to operating a vehicle, such as an autonomous vehicle, within an environment.

At operation 604, the process 600 includes identifying an object from the first sensor data. The object may be identified by one or more characteristics. The characteristics may include visible characteristics such as license plates, vehicle color, vehicle model, gait pattern, clothing worn, facial features and/or facial recognition techniques, and other such image-based techniques. In some examples, the characteristics may include non-visible characteristics such as distinct sounds, such as engine sound profiles, wireless communications and/or pings from remote computing devices, and other such recognizable features of objects. The identification may be sufficient to uniquely identify the object but may not include personal identifying information that would enable identification of identifying information for an owner, operator, or pedestrian associated with the object. In this manner, the object may be uniquely identified while maintaining personal and individual privacy.

At operation 606, the process 600 includes determining a behavior profile for the object. The behavior profile may be determined based on the sensor data and may include actions performed by the object in the environment. The actions may be compared against expected behavior and/or a neutral behavioral profile to identify behavior patterns of the objects. The behavior profile may include expected actions based on previously observed behavior, risk scores, aggressiveness scores, and other such information.

At operation 608, the process 600 includes determining whether a risk score exceeds a threshold. The risk score exceeding a threshold may include identifying a particularly high-risk or at-risk object within the environment. In some examples the threshold may be for a behavior profile, aggressiveness score, or other metric based on object behavior and performance. The determination may be performed to identify objects that vary more than a threshold amount from an expected behavior or profile. In response to determining that a score does not exceed a threshold, the profile may not be stored for the particular object. In some examples a neutral profile may be used for the object and a next object may be identified at 604 to continue generating behavior profiles. In response to the score exceeding the threshold, the behavior profile may be stored either locally or at a remote computing device.

Based on a determination that the risk score does not meet or exceed the threshold ("No" at operation 608), the process 600 includes identifying another object operating in the environment. In some examples, the system can be configured to continually identify different objects in the environment to determine whether an object operating proximate the object may constitute a risk to the safe operation thereof (e.g., aggressive behavior profile, etc.).

Based on a determination that the risk score exceeds the threshold ("Yes" at operation 608), the process 600, at operation 610 includes storing the behavior profile. Storing the profile may include storing at a local device, such as in a memory cache with a memory that may only persist a predetermined length of time after the object has left the detectable range of the sensor array of the vehicle. In some examples after the period of time the behavior profile may be removed and/or erased from the memory cache. In some examples, storing the profile may include storing at a remote device. Storing the behavior profile may include updating a central storage system for a fleet of vehicles, periodically applying updates to the stored behavior profiles.

At 612, the process 600 includes determining whether there are fleet vehicles within a threshold distance of the vehicle. The threshold distance may include a distance that may be traversed within a threshold period of time, such as within a distance of less than five miles, or some other threshold. In some examples, the threshold distance may include a geofenced location where the fleet of vehicles is configured and authorized to operate.

Based on a determination that at least one other vehicle of the fleet of vehicles is within the threshold distance ("Yes" at operation 612), the process 600, at operation 614 includes conveying the behavior profile and identifier to the fleet vehicles within the threshold distance. The conveyed data may be directly communicated to the vehicles without passing through a central server in some examples. In this manner, a direct communication link may be established between the local vehicles and the behavior profile directly transferred. In some examples an alert may be included to notify the vehicle of a particularly risky vehicle, such as a vehicle identified as risky for potentially being operated by a driver under the influence of a substance, such as alcohol, that impairs their ability to operate the vehicle.

Based on a determination that no other vehicles of the fleet of vehicles are within the threshold distance ("No" at operation 612), the process 600, at operation 616 includes storing the behavior profile and identifier at a remote device for access by one or more fleet vehicles at a future time. The data may be periodically updated to the fleet of vehicles. In some examples, the data may be associated with location data that is pushed or propagated to vehicles operating within a particular region. In this manner, vehicles may receive behavior profile data for objects expected to be in the region without including all available behavior profiles.

At operation 618, the process 600 includes adjusting a vehicle control parameter for the vehicle and/or a fleet vehicle when in proximity of the object. Adjusting the vehicle control parameter may include changing operation, planning, or control of a vehicle system in response to the information included within the behavior profile. For example, a high-risk score may be used to control the vehicle system to introduce additional safety factors to account for the increased risk while in proximity to the object. In some examples the changes may be based on proximity to the object, such that such changes may only be applied when the vehicle is within a threshold distance of the object.

Example Clauses

A. A system comprising: one or more processors; and non-transitory computer readable media storing instructions that when executed by the one or more processors, cause the autonomous vehicle system to perform operations comprising: receiving first sensor data associated with an environment of a first vehicle, the first sensor data indicative of a presence of an object in proximity to the first vehicle and including a characteristic of the object; determining a behavior profile of the object based at least in part on the first sensor data, the behavior profile indicative of a predicted response by the object for a condition; determining a unique identifier of the object based at least in part on the first sensor data; and storing the behavior profile and the unique identifier in a database, the database accessible by a second vehicle.

B. The system of example A, wherein: the first sensor data includes location data; and the behavior profile is stored in the database based at least in part on the location data.

C. The system of example B, further comprising conveying to the second vehicle, the behavior profile and the unique identifier in response to determining that the second vehicle is within a threshold distance of a geographic location indicated by the location data.

D. The system of any of example A-C, wherein the sensor data comprises first sensor data associated with a first time, and wherein the operations further comprise: receiving second sensor data associated with a second time after the first time, the second sensor data indicative of a presence of an object in the environment at the second time and including a characteristic of the object; determining the unique identifier of the object based at least in part on the first sensor data; accessing a stored behavior profile in the database based at least in part on the unique identifier; and modifying the behavior profile for the object based at least in part on the second sensor data.

E. The system of any of examples A-D, wherein storing the behavior profile comprises: generating a hash based at least in part on the unique identifier are associated with a geographic location; and storing the behavior profile in the database using the hash as a profile identifier.

F. The system of any of examples A-E, further comprising receiving second sensor data associated with the environment, the second sensor data indicative of a presence of a second object operating in the environment and including a second characteristic of the second object; determining a second behavior profile of the second object based at least in part on the second sensor data; determining a second unique identifier of the second object based at least in part on the second sensor data; and storing the second behavior profile and the second unique identifier in the database.

G. A method, comprising: determining a behavior profile corresponding to an object within an environment in which a fleet of vehicles operate based at least in part on sensor data associated with the environment; determining a unique identifier for the object derived from the sensor data associated with the environment; storing the behavior profile with the unique identifier; and conveying the behavior profile to at least one vehicle of the fleet of vehicles, wherein the behavior profile is accessible via the unique identifier.

H. The method of example G, wherein the behavior profile is associated with a location of the object and conveying the behavior profile to the fleet of vehicles comprising conveying the behavior profile to a subset of the fleet of vehicles within a predetermined distance of the location.

I. The method of example H, wherein the unique identifier comprises a hash value that includes the location of the object.

J. The method of any of examples G-I, wherein conveying the behavior profile comprises providing the behavior profile in response to receiving a request for the behavior profile identified by the unique identifier from a vehicle of the fleet of vehicles.

K. The method of example J, wherein the request includes a location of the vehicle, and the behavior profile is determined based at least in part on the location.

L. The method of any of examples G-K, further comprising determining a likelihood for the object to diverge from an expected behavior, wherein conveying the behavior profile to the fleet is based at least in part on the likelihood for the object to diverge from the expected behavior meeting or exceeding a threshold value.

M. The method of any of examples G-L, wherein determining the behavior profile comprises: accessing the database and selecting the behavior profile for the object based on the unique identifier; and updating the behavior profile based at least in part on the sensor data.

N. The method of any of examples G-M, wherein the behavior profile includes a confidence score, the confidence score indicative of a confidence of the behavior profile to predict behavior of the object, wherein the confidence score is based at least in part on a temporal proximity of the behavior profile to a present time and additional observations of the object.

O. A non-transitory computer-readable medium storing instructions executable by a processor, wherein the instructions, when executed, cause the processor to perform operations comprising: determining a behavior profile corresponding to an object within an environment in which a fleet of vehicles operate based at least in part on sensor data associated with the environment; determining a unique identifier for the object derived from the sensor data associated with the environment; storing the behavior profile with the unique identifier; and conveying the behavior profile to at least one vehicle of the fleet of vehicles, wherein the behavior profile is accessible via the unique identifier.

P. The non-transitory computer-readable medium of example O, wherein the unique identifier comprises a hash value that includes the characteristic of the object.

Q. The non-transitory computer-readable medium of any of examples O-P, wherein conveying the behavior profile to the fleet of vehicles comprises communicating directly with one or more vehicles of the fleet of vehicles based on the one or more vehicles being within a threshold distance of the object.

R. The non-transitory computer-readable medium of any of examples O-Q claim 15, wherein determining the behavior profile comprises: accessing the database and selecting the behavior profile for the object based on the unique identifier; and updating the behavior profile based at least in part on the sensor data.

S. The non-transitory computer-readable medium of any of examples O-R, wherein the operations further comprise determining a likelihood for the object to diverge from an expected behavior, wherein conveying the behavior profile to the fleet is based at least in part on the likelihood for the object to diverge from the expected behavior meeting or exceeding a threshold value.

T. The non-transitory computer-readable medium of any of examples O-S, wherein conveying the behavior profile comprises updating a cloud-based database of behavior profiles accessible by the fleet of vehicles.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising: one or more processors; and one or more non-transitory computer-readable media storing computer-executable instructions that, when executed, cause the system to perform operations comprising:

determining a behavior profile corresponding to an object within an environment in which a fleet of vehicles operate;

determining an identifier that is unique to the object;

storing the behavior profile with the identifier in a database, the database comprising data associated with a second vehicle and a non-vehicle; and conveying the behavior profile to a vehicle of the fleet of vehicles, wherein movement of the vehicle is controlled based at least in part on the behavior profile.

2. The system of claim 1, wherein the identifier is determined based at least in part on third party data.

3. The system of claim 1, wherein determining the identifier is based at least in part on:

receiving, from a sensor device associated with the vehicle, sensor data, wherein the identifier is determined based at least in part on the sensor data.

4. The system of claim 1, wherein the object associated with the behavior profile is at a location in the environment, and the operations further comprise:

conveying the behavior profile to a subset of the fleet of vehicles within a predetermined distance of the location.

5. The system of claim 1, the operations further comprising:

determining a likelihood for the object to diverge from an expected behavior;

determining that the likelihood meets or exceeds a threshold value; and conveying the behavior profile to the fleet of vehicles based at least in part on the likelihood meeting or exceeding the threshold value.

6. One or more non transitory computer readable media storing instructions executable by one or more processors, wherein the instructions, when executed, cause a system to perform operations comprising:

determining a behavior profile corresponding to an object within an environment in which a fleet of vehicles operate;

determining an identifier that is unique to the object;

storing the behavior profile with the identifier; and conveying the behavior profile to a vehicle of the fleet of vehicles, wherein movement of the vehicle is controlled based at least in part on the behavior profile.

7. The one or more non transitory computer readable media of claim 6, wherein the identifier is determined based at least in part on third party data.

8. The one or more non transitory computer readable media of claim 6, wherein determining the identifier is based at least in part on:

receiving, from a sensor device associated with the vehicle, sensor data, wherein the identifier is determined based at least in part on the sensor data.

9. The one or more non transitory computer readable media of claim 6, wherein the object associated with the behavior profile is at a location in the environment, and the operations further comprise:

conveying the behavior profile to a subset of the fleet of vehicles within a predetermined distance of the location.

10. The one or more non transitory computer readable media of claim 6, the operations further comprising:

determining a likelihood for the object to diverge from an expected behavior;

determining that the likelihood meets or exceeds a threshold value; and conveying the behavior profile to the fleet of vehicles based at least in part on the likelihood meeting or exceeding the threshold value.

11. The one or more non transitory computer readable media of claim 6, wherein the behavior profile includes a confidence score, the confidence score indicative of a confidence of the behavior profile to predict behavior of the object, wherein the confidence score is based at least in part on a temporal proximity of the behavior profile to a present time and additional observations of the object.

12. The one or more non transitory computer readable media of claim 6, the operations further comprising:

accessing, based at least in part on the identifier, a database;

selecting, from the database, the behavior profile for the object; and updating the behavior profile based at least in part on sensor data.

13. The one or more non transitory computer readable media of claim 6, wherein the identifier comprises a hash value that includes a location of the object.

14. A method comprising:

determining a behavior profile corresponding to an object within an environment in which a fleet of vehicles operate;

determining an identifier that is unique to the object;

storing the behavior profile with the identifier; and conveying the behavior profile to a vehicle of the fleet of vehicles, wherein movement of the vehicle is controlled based at least in part on the behavior profile.

15. The method of claim 14, wherein the identifier is determined based at least in part on third party data.

16. The method of claim 14, wherein determining the identifier is based at least in part on:

receiving, from a sensor device associated with the vehicle, sensor data, wherein the identifier is determined based at least in part on the sensor data.

17. The method of claim 14, wherein the object associated with the behavior profile is at a location in the environment, and the method further comprises:

conveying the behavior profile to a subset of the fleet of vehicles within a predetermined distance of the location.

18. The method of claim 14, further comprising:

determining a likelihood for the object to diverge from an expected behavior;

determining that the likelihood meets or exceeds a threshold value; and conveying the behavior profile to the fleet of vehicles based at least in part on the likelihood meeting or exceeding the threshold value.

19. The method of claim 14, wherein the identifier comprises a hash value that includes a location of the object.

20. The method of claim 14, further comprising:

accessing, based at least in part on the identifier, a database;

selecting, from the database, the behavior profile for the object; and updating the behavior profile based at least in part on sensor data.

* * * * *